Jan. 30, 1951          J. D. GLEITZ          2,539,996
PUMP PACKING MEANS
Filed March 28, 1945
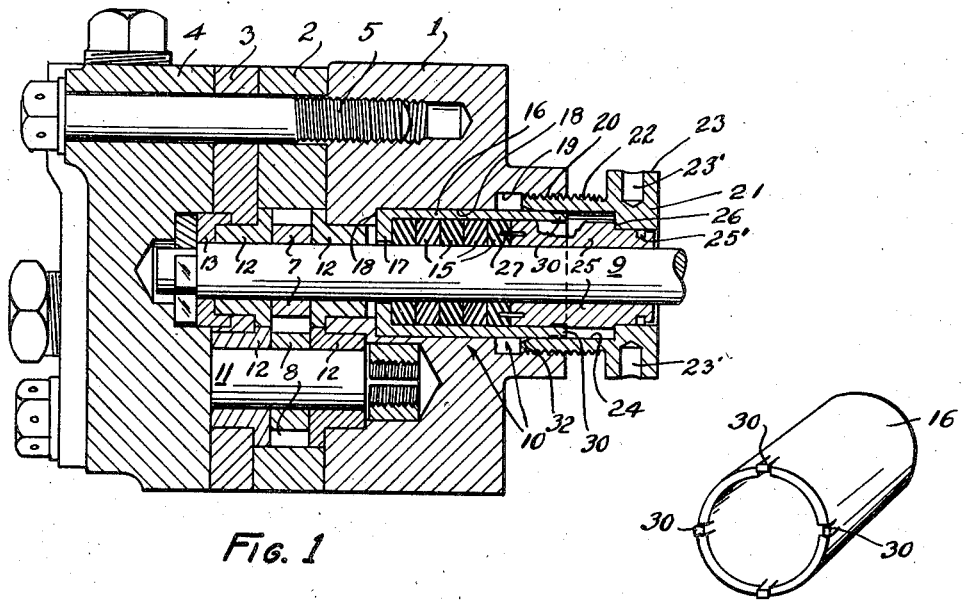
Fig. 1
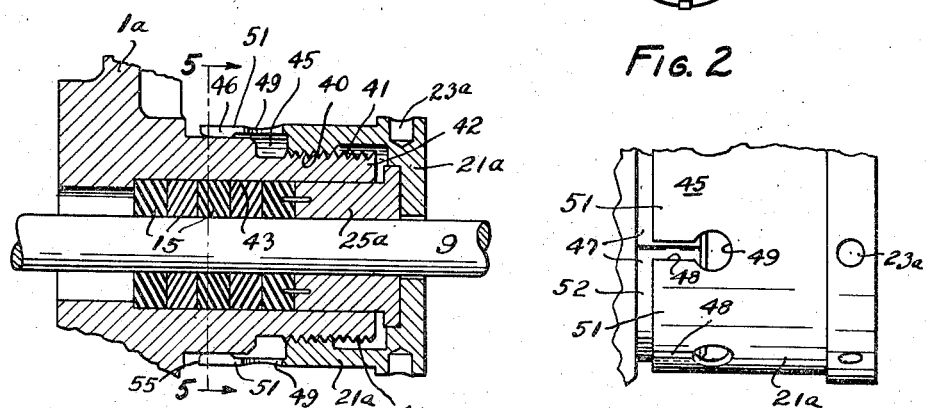
Fig. 2
Fig. 3
Fig. 4
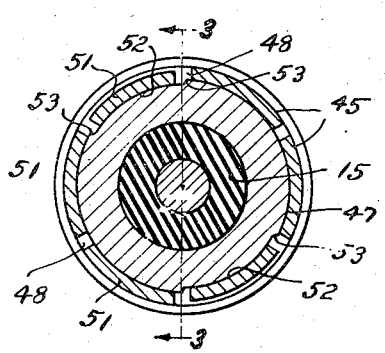
Fig. 5
INVENTOR.
JEROME D. GLEITZ
BY
ATTORNEY Patented Jan. 30, 1951

2,539,996

UNITED STATES PATENT OFFICE 2,539,996

PUMP PACKING MEANS

Jerome D. Gleitz, Euclid, Ohio, assignor to The Marquette Metal Products Company, Cleveland, Ohio, a corporation of Ohio Application March 28, 1945, Serial No. 585,327

2 Claims. (Cl. 286—34)

This invention relates to an improvement in high pressure pumps and particularly to a sealing device for a rotary drive shaft of such pump. The application is a continuation in part of my application Serial No. 472,861, filed January 19, 1943, now Patent No. 2,447,853. Said application shows, in Figs. 3 and 8, thereof, one form of packing nut retainer claimed hereby.

High pressure pumps of the gear pump type for example, require that the drive shaft extend out of the case in at least one direction for connection with a driving means. Because of the high pressures apt to be used it is practically impossible to isolate the circular region of shaft and bearing contact from the high pressure chamber of the pump. Therefore a sealing means of some kind must be provided around the drive shaft between the latter and pump case. The most practical sealing means for use with high pressure pumps is a packing gland and nut assembly largely because such an arrangement is subject to ready adjustment to vary the sealing force of the packing against the shaft. It is expensive to provide (and sometimes there is no available space for) lock nuts and equivalent means for locking the nut or sleeve; and even if such locks are provided the service men in charge of the adjustment would often fail to effect locking of the packing nut or sleeve thereby and as a result the adjustment is apt to be disturbed, permitting leakage. The leakage may not be observed until considerable fluid has been lost and loss of fluid in many cases, as in high pressure lubricators and fuel supply systems of Diesel engines can become disastrous in a short time.

In view of the above a further object is to provide a locking means for a threaded packing gland nut or sleeve which means in order to effect locking requires no attention whatsoever on the part of the operator or service man.

Another object is to provide a threaded packing nut or sleeve locking device operative to lock the nut or sleeve in position against displacement due to turning of the pump shaft in either direction.

Other objects and featurers of the invention will become apparent from the following description of the preferred forms shown in the drawings. The essential characteristics are summarized in the claims.

In the drawings:

Fig. 1 is a longitudinal sectional view showing one form of pump to which the present invention is applicable;

Fig. 2 is a perspective view of a packing retainer sleeve employing the locking means hereof in one form;

Fig. 3 is a fragmentary sectional view corresponding to the right hand portion of Fig. 1, showing a modified locking means particularly adapted to serve with an internally threaded packing nut;

Fig. 4 is a fragmentary elevational view of the modified form of nut and locking feature thereof and Fig. 5 is a transverse sectional view taken along the line 5—5 on Fig. 3.

Referring to Fig. 1 the pump may comprise a series of body or casing sections 1, 2, 3 and 4, held together by suitable clamping bolts or studs, one of which is shown at 5 so as to form suction and pressure chambers, not shown herein, adjacent mutually meshing pump gears 7 and 8. 7 is the driving gear in the particular arrangement shown and the drive shaft 9 is keyed, splined or pinned to the driving gear and extends from the pump case, as to the right in the illustration, through a packing assembly generally shown at 10 with which the present invention is largely concerned.

The driven or idler gear 8 has a supporting shaft 11 and the two shafts are supported primarily in bushings 12 which are very similar in shape. An additional bushing 13 supports the inner end of the drive shaft 9. The various bushings operate to dowel the body sections together in a manner to hold the gears in proper meshing relationship as emphasized in my copending application.

The drive shaft 9 beyond one of the bushings 12 extends through openings in a series of packing discs 15 preferably of material such as pressed asbestos braid stock formed into rings and the discs are maintained in stacked relationship within a generally cylindrical sleeve 16 having an annular end wall 17 in surrounding spaced relation to the shaft and abutting the inner end of a counterbore 18 in the body section 1. The sleeve 16 may be pressed or shrunk into place in the counterbore so that the sleeve cannot turn. The outer end of the sleeve extends into a further counterbore or enlargement 19 of the casing bore surrounding the sleeve and part of the enlargement 19 is internally threaded as at 20 to receive mating threads 22 on a packing adjusting nut 21, also in the form of a sleeve. The nut has an enlarged head as at 23 for engagement, as at spanner openings 23', with a suitable adjusting wrench. The main inner cylindrical bore 24 of the nut slides over the outer end of the sleeve 16 which projects into the enlarged opening 19. For effecting compression of the packing discs 15, a collar 25 is seated against an annular shoulder 26 of the nut at one end and abuts the outermost packing disc 15 at the opposite end. The collar has a series of sockets 25' at its outer end for engagement by a pulling tool for disassembly and servicing purposes.

Preferably, in order to prevent relative rotation between the packing discs and the collar 25, said collar has a series of pins 27 projecting from its inner end and piercing the adjacent packing ring or disc. There is sufficient friction between the discs of packing material and between said material and the peripheral wall of the sleeve 10 so that if the collar 25 is prevented from turning with reference to one of the packing discs it is prevented from turning with reference to the packing disc assembly. Therefore, when the nut 21 is turned to compress the packing the collar 25 is moved only endwise by the nut and does not tend to scuff the packing.

If the threads of the packing nut 21 fitted the threads of the body section 1 sufficiently tightly there would be little or no need of any additional means to secure said nut against rotation out of adjusted position. However, so to make the threads is a difficult machining operation since if the threads are only slightly oversize the nut cannot be inserted and if slightly undersize no locking or restraint would be possible.

The means for locking the packing adjusting nut herein shown comprises the formation of a plurality of spring tongues 30 on the outer end of the packing retainer sleeve 16. The tongues 30 are formed by slitting the metal of the sleeve 16 in an axial direction without removing metal therefrom and springing of the tongues outwardly for frictional engagement with the peripheral inner wall of the packing nut 21 at the cylindrical interior surface 24 thereof. The tongues extend outwardly from the general cylindrical exterior surface of the sleeve 16 far enough so that in order to insert the packing nut all the tongues are brought by movement of the nut substantially into their original position (i. e. before being struck outwardly from the metal of the sleeve). To assist in forcing the tongues inwardly when the packing nut 21 is installed the inner diameter and end surfaces of the thread carrying portion of the packing nut are chamfered as at 32 (or the tongues can be similarly chamfered instead) and the thus enlarged entrance to the bore 24 of the packing nut is obviously effective to move the tongues inwardly so that all must bear with substantial spring pressure against the inner bore of the packing nut when the nut is moved as into a position such as in Fig. 1. Two only of such spring tongues will effect adequate locking of the packing adjusting nut 21 against being rotated out of position in either direction. The device is more effective and has longer life if more than two tongues are used since for example, four will better resist being weakened by fatigue of the metal of the tongues. The side edges of the tongues, being abrupt and sharp act more or less like ratchet teeth and, during service of the pump the sharp edges of the tongues locally indent the metal of the packing nut for increasing the anti-rotational position retaining effect on the packing nut.

In the modified construction shown in Figs. 3 to 5 the threaded packing nut designated 21a has internal threads at 40 engaging external threads 41 on a tubular member 42 which is preferably formed as part of the body section 1a of the pump case.

In the construction shown by Fig. 3 there is no sleeve corresponding to the packing retainer and nut locking sleeve 16 of Fig. 1. Instead, the packing discs 15 are contained in a suitable cylindrical counterbore 43 of the tubular extension 42 of the pump case and the compression collar 25a is slidably mounted in said counterbore for engagement with the adjacent packing disc 15 at one end and with an annular shoulder surface 26a on the packing nut 21a at the other end. The enlarged head of the nut is provided with suitable wrench engaging means shown in the form of spanner openings 23a. The nut 21a has a skirt portion 45 of greatly reduced wall thickness inwardly toward the pump case beyond the threads 40. The inner margin of the skirt is thickened as at 46 for frictional engagement with a generally cylindrical surface portion 47 of the extension 42.

As brought out particularly by Figs. 4 and 5 the skirt 45 has a circumferentially spaced series of axial slots 48 which, as shown, are enlarged at their inner ends as at 49 by radial bores to facilitate formation of the slots. The slots intersect the reduced wall thickness portion 45 of the skirt so that the unslotted portions of the skirt form spring tongues 51 for engagement with the generally cylindrical surface 47 of the extension 42. Said generally cylindrical surface has one or more reduced diameter axially extending portions as indicated particularly on Figs. 4 and 5 at 52. As shown there are two diametrically opposed reduced diameter portions 52. The surface portions 52 are defined laterally by inclined parallel shoulders 53 merging with the reduced diameter surface 52 and the relatively enlarged diameter portions constituting the main surface 47. The shoulders 53 form ramps spaced circumferentially of the extension 42 slightly wider apart than the transverse dimensions of the thickened portions 46 of the tongues 51. With such an arrangement, when the packing nut 21a is turned to compress the packing discs 15 the desired amount in order to effect a seal around the shaft, two oppositely disposed spring tongues 51 become interposed circumferentially between respective pairs of shoulders 53. Additionally the tongues may engage the reduced diameter portions 52. Thus the thickened edge or bearing portions (at 46) are positioned for abutment with one or the other ramp shoulder surface 53 depending upon the direction in which the nut or sleeve 21 tends to turn due to rotation of the drive shaft under load and due to vibration. The remaining tongues have their thickened edge portions maintained by the spring of the metal of the tongues in tight frictional engagement with the relatively enlarged diameter portions of the surface 47 so that those tongues also assist in retaining the packing sleeve or nut against rotation out of place.

When the packing nut 21a is adjusted to compress the packing the opposite side edges of the tongues 51 are forced to ride radially outwardly on the ramps afforded by the shoulders 53 allowing another set of spring tongues to enter the depressions formed by the reduced diameter surface portions 52 for retaining engagement by the shoulders. To assist in springing the tongues outwardly so that they will slide over the generally cylindrical surface portions 47, in initially assembling the packing nut on the pump case, the skirt 45 may be chamfered as at 55 or the necessary chamfer may be formed instead on the extension 42 adjacent the outer end of the enlarged diameter portion 47.

In making the skirt portion of the nut 21a, said skirt portion is preferably cylindrical to facilitate formation, e. g. as a circular end milling or screw machine operation, and of such internal diameter that the skirt will slip over the generally cylindrical (larger diameter) portion 47 without tight frictional engagement therewith. Afterward the tongues are all sprung inwardly as by a suitable die in a press far enough so that the thickened portions 46 of the spring tongues will occupy the locking positions illustrated by Figs. 3 and 5 or approximately those positions.

I claim:

1. In a pump having a rotary drive shaft and a casing, packing means between the shaft and casing, an adjusting device for the packing means including a nut in screw threaded relationship to a tubular member forming in effect part of the casing, said member having a generally cylindrical portion indented radially for part of its circumference and extending lengthwise of the cylindrical portion, and spring tongues on the nut having thickened head and reduced thickness shank portions, the head portions being adapted to be forced by spring pressure of the shank portions into strained frictional contact with a defining wall surface of the indentation for restraining the nut from turning out of adjusted position.

2. In a pump having a rotary drive shaft and a casing, packing means between the shaft and casing, an adjusting device for the packing means including a nut in screw threaded relationship to a tubular member forming in effect part of the casing, said member having a generally cylindrical portion indented radially and circularly formed at the indented and non-indented portions to provide oppositely disposed channels with sloping side walls extending lengthwise of the cylindrical portion, and a circumferentially spaced series of spring tongues on a skirt portion of the nut circumferentially of no greater length than the corresponding width of the channels adapted to be forced by spring pressure of said tongues into the channels selectively as determined by forcibly turned positions of the nut for restraining the nut from turning out of adjusted position.

JEROME D. GLEITZ.

REFERENCES CITED

The following references are of record in the file of this patent:

UNITED STATES PATENTS

| Number | Name | Date |
|---|---|---|
| 982,397 | Taylor | Jan. 24, 1911 |
| 1,230,124 | Connor | June 19, 1917 |
| 1,394,184 | Morse | Oct. 18, 1921 |
| 1,530,505 | Levedahl | Mar. 24, 1925 |
| 1,717,321 | Andresen | June 11, 1929 |
| 2,210,473 | Testa | Aug. 6, 1940 |